(12) United States Patent
Lozano et al.

(10) Patent No.: US 11,697,722 B2
(45) Date of Patent: Jul. 11, 2023

(54) SYSTEM AND PROCESS FOR RECYCLING FOAM

(71) Applicant: Board of Regents, the University of Texas System, Austin, TX (US)

(72) Inventors: Karen Lozano, Edinburg, TX (US); Luis Sosa, Edinburg, TX (US); Adonica De Los Santos, Edinburg, TX (US); Salomon Luna, Edinburg, TX (US); Jared Solis, Edinburg, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 68 days.

(21) Appl. No.: 17/307,898

(22) Filed: May 4, 2021

(65) Prior Publication Data
US 2021/0388171 A1 Dec. 16, 2021

Related U.S. Application Data

(60) Provisional application No. 63/020,347, filed on May 5, 2020.

(51) Int. Cl.

| | | |
|---|---|---|
| *B09B 3/80* | (2022.01) | |
| *C08J 11/08* | (2006.01) | |
| *B02C 18/08* | (2006.01) | |
| *B01D 11/02* | (2006.01) | |
| *B09B 3/40* | (2022.01) | |
| *B29B 17/04* | (2006.01) | |

(52) U.S. Cl.
CPC ............ *C08J 11/08* (2013.01); *B01D 11/0296* (2013.01); *B02C 18/086* (2013.01); *B09B 3/40* (2022.01); *B09B 3/80* (2022.01); *B29B 17/0412* (2013.01); *B29B 2017/0448* (2013.01); *C08J 2325/06* (2013.01)

(58) Field of Classification Search
CPC ............... C08J 11/08; B09B 3/80; B09B 3/40
USPC .......................................................... 521/46
See application file for complete search history.

(56) References Cited

U.S. PATENT DOCUMENTS

| | | |
|---|---|---|
| 6,090,862 A | 7/2000 | Tatsuda et al. |
| 11,174,603 B2 | 11/2021 | Reinke et al. |
| 11,192,996 B2 | 12/2021 | Liao et al. |
| 2002/0093116 A1 | 7/2002 | Ming-Ti |

FOREIGN PATENT DOCUMENTS

| | | | |
|---|---|---|---|
| ES | 2283026 | * | 10/2007 |
| JP | H10314713 A | * | 12/1998 |

OTHER PUBLICATIONS

ES2283026 Machine Translation; High Resistance Flexible Packing Film. (Year: 2007).*
H10314713 Machine Translation; Method and Device for Treating Mixed Waste (Year: 1998).*

* cited by examiner

*Primary Examiner* — Terressa Boykin

(57) ABSTRACT

System and methods for recycling a material comprising a polymer in an expanded state is disclosed. The system can include a shredder, a heating chamber operatively connected to the shredder, a condenser operatively connected to the heating chamber, a solvent tank operatively connected to the condenser, and a circulation unit operatively connected to the solvent tank and the heating chamber.

15 Claims, 7 Drawing Sheets

SYSTEM AND PROCESS FOR RECYCLING FOAM

RELATED APPLICATIONS

This application claims priority to U.S. Provisional Patent application Ser. No. 63/020,347 filed May 5, 2020, which is incorporated herein by reference in its entirety.

BACKGROUND

Polystyrene foam, also known as Styrofoam, is a lightweight and water-resistant foam made of polystyrene. Styrofoam is easy to process and conform, and has use in multiple industries. Styrofoam has important practical applications such as in construction (insulation), building docks, and furniture and others such as packing peanuts and crafts. Styrofoam is also used to make coffee cups, plates, and takeout food containers given its low weight, inexpensive, sterile, and chemically, stable nature. Even though attractive, this fact has caused serious environmental concerns. Styrofoam is made of 3-5 vol. % of polystyrene and the rest is air and has high volume compared to weight, i.e., low density. Styrofoam is barely recycled because of the high volume, and inefficiency in transportation to the recycle center is a problem. Given that Styrofoam is basically weightless, it easily gets blown and becomes litter. The material can take thousands of years to biodegrade. Lately, millions of metric tons of Styrofoam have been produced globally and more than half is used for disposable containers. Several cities within the US have banned single use polystyrene containers. Thus new methods and devices are required for recycling Styrofoam.

SUMMARY

Certain embodiments are directed to a device for recycling a material containing a polymer in an expanded state. The device can include a shredder, a heating chamber, a condenser, a solvent tank, and a circulation unit. The shredder can be configured to shred and deconstruct the material to form a shredded material. The heating chamber can be operatively connected to the shredder. The heating chamber can be configured to receive the shredded material from the shredder and receive an organic solvent. The shredded material can be contacted with the organic solvent to form a mixture containing a magma and an organic solvent. The mixture can be heated to evaporate the organic solvent, separating the magma from the organic solvent. The magma contains the polymer in an non-expanded amorphous state. The condenser can be operatively connected to the heating chamber. The condenser can be configured to receive the evaporated organic solvent from the heating chamber and condense the evaporated organic solvent into a liquid form. The solvent tank can be operatively connected to the condenser. The solvent tank can be configured to receive the organic solvent from the condenser and store the organic solvent. The circulation unit can be operatively connected to the organic solvent tank and the heating chamber. The circulation unit can be configured to circulate the organic solvent from the solvent tank to the heating chamber. In some aspects, the device can further include a magma tank. The magma tank can be configured to receive the magma from the heating chamber and store the magma. The magma tank can be detachably attached to the heating chamber. In some aspects, the device can further include a connector part. The connector part can be operatively connected to the shredder and the heating chamber. The connector part can be configured to receive the shredded material from the shredder, separate the shredded material from at least a portion of liquids entering the connector part from the shredder and/or liquids in contact with the shredded material in the connector part. The connector part can include a tubular and/or a conical body with a wall containing a plurality of perforations. A long axis of the tubular and/or a conical body can be tilted horizontally at an angle 10° to 80°. Liquids entering the connector part from the shredder and/or liquids in contact with the shredded material can exit the connector part through the plurality of perforations. The shredded material after separation of the liquids can enter the heating chamber. In some aspects, the device can further include a waste tank positioned below the connector part. The waste tank can be configured to receive and store liquids exiting the connector part through the plurality of perforations. In some aspects, the device can further include a device covering configured to house the shredder, the heating unit, the condenser, the solvent tank, the circulation unit, the optional magma tank, the optional connector and the optional waste tank. In some aspects, the device covering can be a three dimensional object with one or more transparent walls.

In some aspects, the heating chamber can include a hollow elongated body containing a top end, a bottom end at an end opposite to the top end, a lumen extending from the top end to the bottom end, and a wall surrounding the lumen, a material inlet valve connected at the top end, a material outlet valve connected at the bottom end, a fluid inlet connected to the wall near the top end, a fluid outlet connected to the wall near the top end; and an heater. The material inlet valve can be configured to allow the shredded material from the shredder, or the connector part to enter the lumen of the hollow elongated body. The fluid inlet can be configured to allow the organic solvent to enter the lumen of the hollow elongated body. The hollow elongated body can be configured to contact the organic solvent and the shredded material in the lumen and form the mixture comprising the magma and the organic solvent at and/or near the bottom end. The heater can be configured to heat the mixture to form the evaporated organic solvent, the fluid outlet can be configured to allow the evaporated organic solvent to exit the lumen, and the material outlet valve can be configured to conditionally allow the magma to exit the hollow elongated body. The hollow elongated body can be cylindrical shaped, conical shaped, or tubular shaped with circular, triangular, square, rectangular, pentagonal, hexagonal, heptagonal, or octagonal cross-section with no or one or more bends. The hollow elongated body can be oriented such the shredded material and the organic solvent entering the lumen of the hollow elongated body at the top end, can pass from the top end to the bottom end of the lumen e.g., under the force of gravity. In some aspects, a long axis of the lumen, or a component of the long axis of the lumen can be oriented vertically and/or at an angle 0° to 45° with respect to the vertical axis.

Certain embodiments are directed to a method of recycling a material containing a polymer in an expanded state using a device of the current invention. The method can include, shredding the material with the shredder to form a shredded material, contacting the shredded material with an organic solvent in the heating chamber to form a mixture containing a magma and the organic solvent, heating the mixture to evaporate the organic solvent and separate the organic solvent and the magma, introducing the evaporated organic solvent in the condenser and condensing the evaporated organic solvent to form the organic solvent; and introducing the organic solvent in the solvent tank from the condenser. The magma can contain the polymer in a non-expanded amorphous state. In some aspects, the magma from the heating chamber after separation of the organic solvent can be introduced in the magma tank. In some aspects, the magma from the magma tank can be used in making materials containing the polymer. In some aspects, the shredded material from the shredder can be introduced in the connector part, and at least a portion of a liquid in contact with the shredded material can be separated from the shredded material, where at least a portion of the liquid escapes the connector part through the plurality of the holes in the connector part. The shredded material after separation of the at least a portion of the liquid can be introduced in the heating chamber. In some aspects, volume of the polymer in the non-extended amorphous state can be 10% to 20% of volume of the polymer in the expanded state. In some aspects, the polymer can be polystyrene and the polymer in the expanded state can be Styrofoam. In some aspects, the magma can contain polystyrene, and the magma can be used to form Styrofoam. In some aspects, the material can be or a part of a Styrofoam cup, box, and/or Styrofoam food container. In some aspects, the organic solvent can be acetone. In some aspects, the mixture in the heating chamber can be heated at a temperature 55° C. to 65° C. to evaporate the organic solvent. In some aspects, the method can include the steps as shown in FIG. 1

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions and kits of the invention can be used to achieve methods of the invention.

The term "organic solvent" refers to the organic solvent in liquid form. The term "evaporated organic solvent" refers to the organic solvent in gaseous and/or vapor form.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a chemical composition and/or method that "comprises" a list of elements (e.g., components or features or steps) is not necessarily limited to only those elements (or components or features or steps), but may include other elements (or components or features or steps) not expressly listed or inherent to the chemical composition and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a chemical composition and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

DETAILED DESCRIPTION

Figure 1:
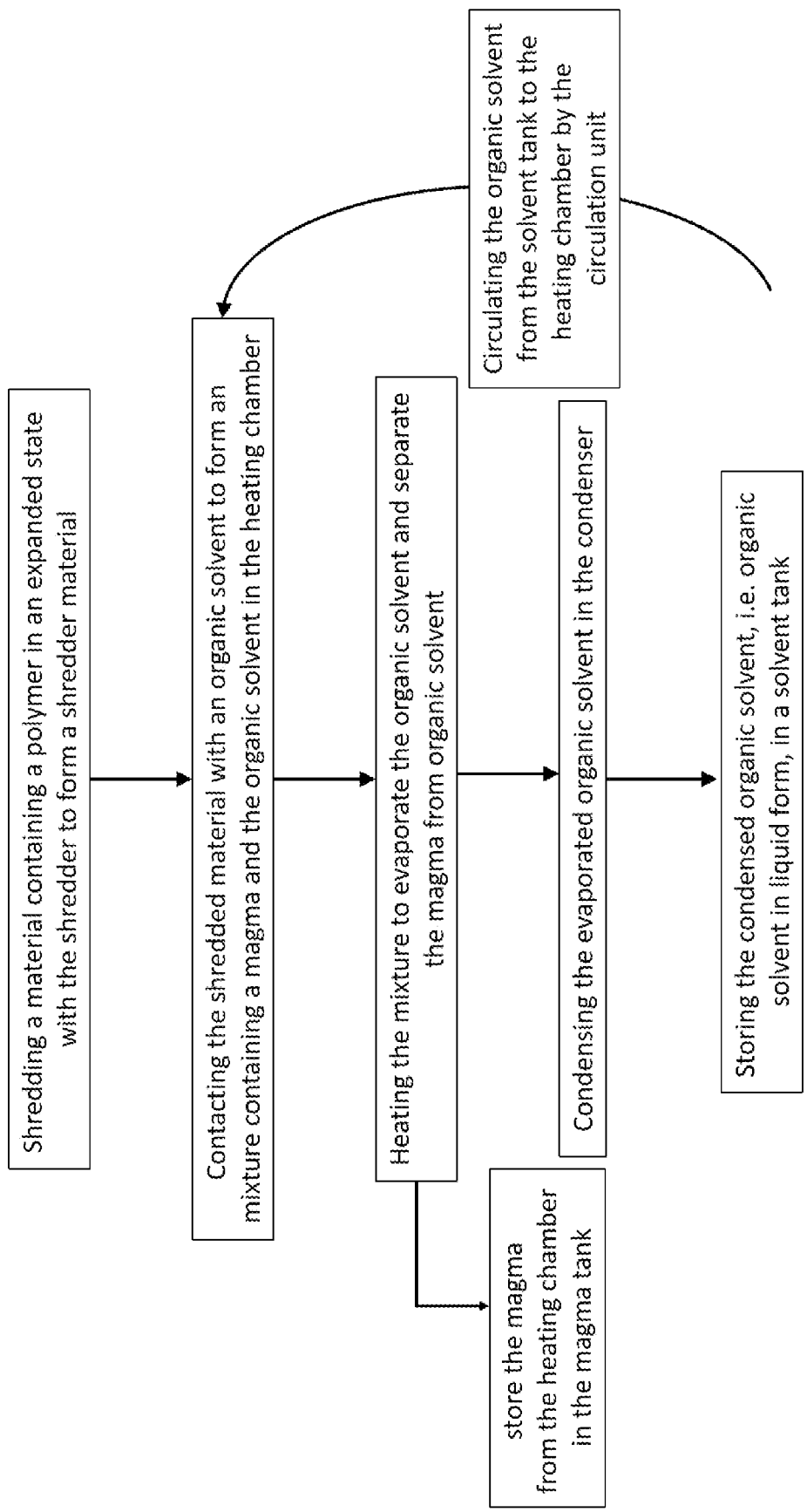
FIG. 1: Flowchart of a method for recycling a material comprising a polymer in an expanded state according to one example of the current invention.
Figure 2:
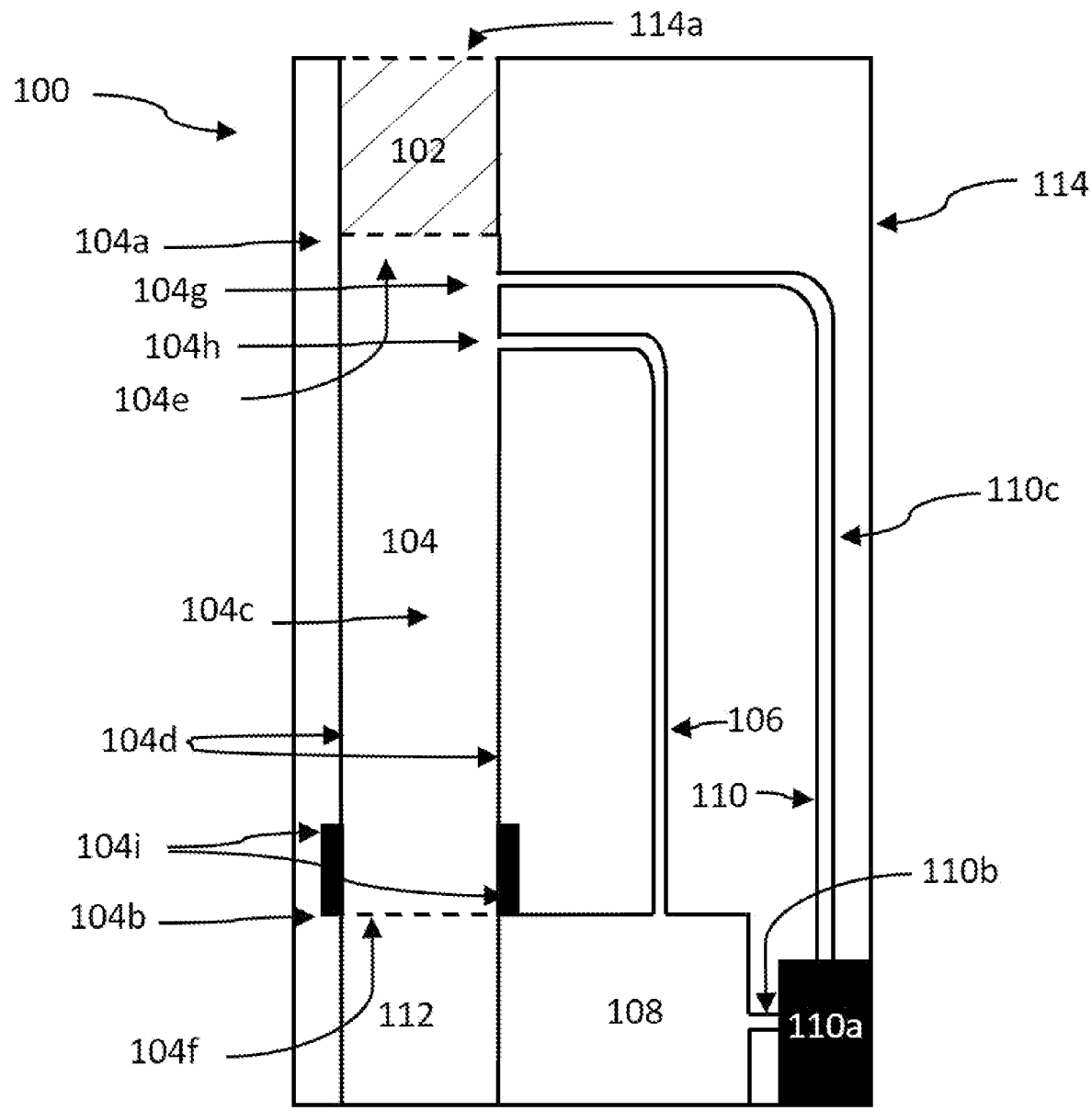
FIG. 2: Schematic of a device according to one example of the current invention.

Referring to FIG. 2, a device according to one embodiment of the current invention is described. FIG. 2 shows a vertical cross-sectional view of the device 100. The device 100 can include a shredder 102, a heating chamber 104, a condenser 106, a solvent tank 108, a circulation unit 110, a magma tank 112 and a device covering 114. The heating chamber 104 can be operatively connected with the shredder 102. The condenser 106 can be operatively connected with the heating chamber 104. The magma tank 112 can be operatively connected with the heating chamber 104. The solvent tank 108 can be operatively connected with the condenser 106. The circulation unit 110 can be operatively connected with the solvent tank 108 and the heating chamber 104. The shredder 102, the heating chamber 104, the condenser 106, the solvent tank 108, the circulation unit 110, and the magma tank 112 can be housed inside the device covering 114. The shredder 102 is configured to shred materials comprising a polymer in an expanded state and form a shredded material. The shredded material from the shredder 102 can enter the heating chamber 104. The heating chamber 104 can include a hollow elongated body including a top end 104a, a bottom end 104b at an end opposite to the top end 104a, a lumen 104c extending from the top end 104a to the bottom end 104b, and a wall 104d surrounding the lumen 104c; a material inlet valve 104e connected at the top end; a material outlet valve 104f connected at the bottom end; a fluid inlet 104g connected to the wall 104d near the top end 104a; a fluid outlet 104h connected to the wall 104d near the top end 104a; and one or more heater(s) 104i. The shredded material from the shredder 102 can enter the lumen 104c and the heating chamber 104 through the material inlet valve 104e. An organic solvent from the solvent tank 108 can enter the lumen 104c and the heating chamber 104 through the fluid inlet 104g. In the lumen 104c of the hollow elongated body the organic solvent can contact with the shredded material and can form a mixture containing a magma and the organic solvent at or near the bottom end 104b. The magma can include the polymer in a non-expanded amorphous state. The mixture can be heated with the one or more heater(s) 104i to evaporate the organic solvent and separate the magma from the organic solvent. The evaporated organic solvent can exit the lumen 104c and the heating chamber 104 through the fluid outlet 104h and enter the condenser 106. In the condenser 106 the evaporated organic solvent can be cooled and condensed to form the organic solvent. The organic solvent from the condenser can enter and be stored in the solvent tank 108. The organic solvent can be circulated from the solvent tank 108 to the heating chamber 104 by the circulation unit 110. The circulation unit 110 can include a pump 110a, a first pipe 110b operatively connected with the pump 110a and the solvent tank 108, and a second pipe 110c operatively connected with the pump 110a and the fluid inlet 104g of the heating chamber 104. The pump 110a can be operated to withdraw the organic solvent from the solvent tank 108 through the first pipe 110b and circulate the organic solvent to the heating chamber 104 via the fluid inlet 104g through the second pipe 110c.

Figure 3:
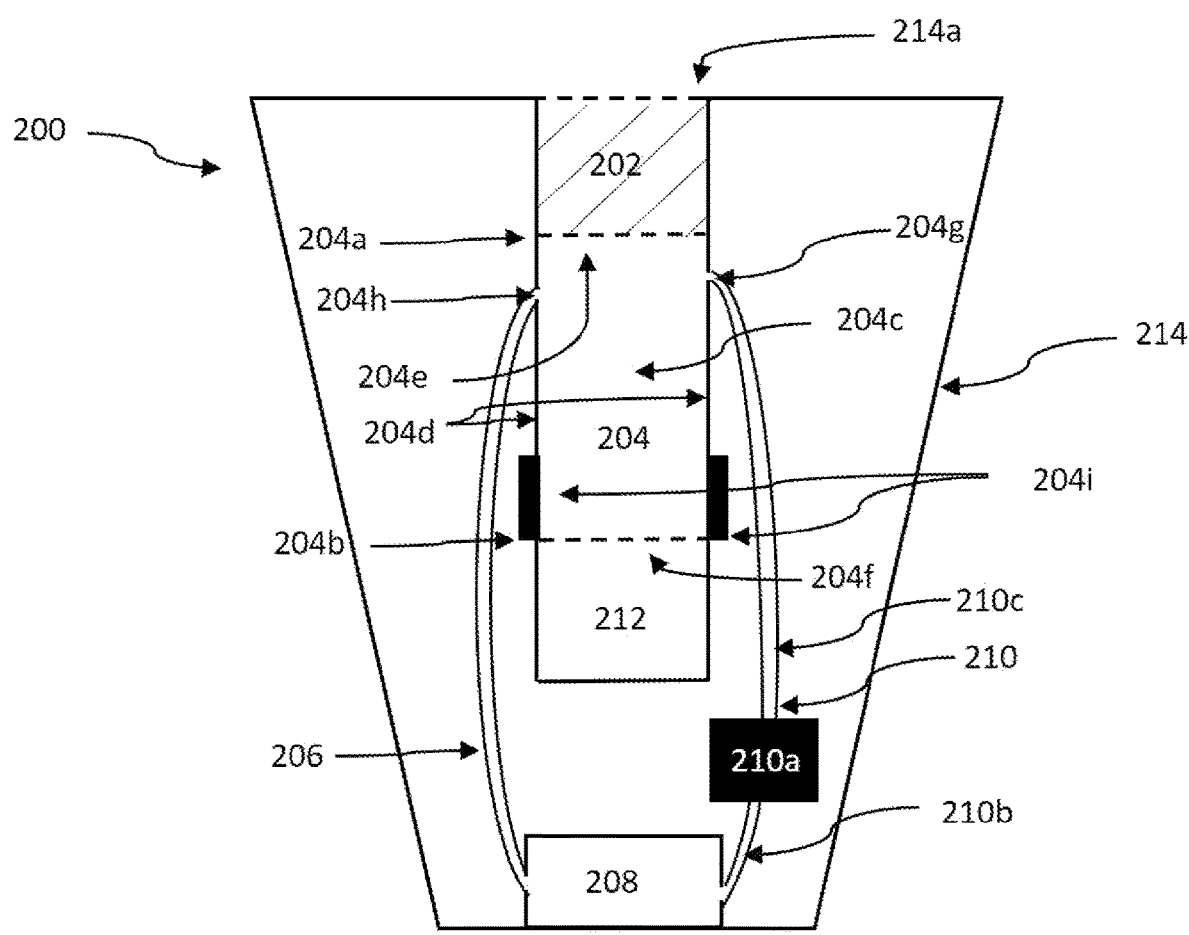
FIG. 3: Schematic of a device according to a second example of the current invention.

Referring to FIG. 3, a device according to another embodiment of the current invention is described. FIG. 3 shows a vertical cross-sectional view of the device 200. The device 200 can include a shredder 202, a heating chamber 204, a condenser 206, a solvent tank 208, a circulation unit 210, a magma tank 212 and a device covering 214. The heating chamber 204 can be operatively connected with the shredder 202. The condenser 206 can be operatively connected with the heating chamber 204. The magma tank 212 can be operatively connected with the heating chamber 204. The solvent tank 208 can be operatively connected with the condenser 206. The circulation unit 210 can be operatively connected with the solvent tank 208 and the heating chamber 204. The shredder 202, the heating chamber 204, the condenser 206, the solvent tank 208, the circulation unit 210, and the magma tank 212 can be housed inside the device covering 214. The heating chamber 204 can include a hollow elongated body containing a top end 204a, a bottom end 204b at an end opposite to the top end 204a, a lumen 204c extending from the top end 204a to the bottom end 204b, and a wall 204d surrounding the lumen 204c; a material inlet valve 204e connected at the top end; a material outlet valve 204f connected at the bottom end; a fluid inlet 204g connected to the wall 204d near the top end 204a; a fluid outlet 204h connected to the wall 204d near the top end 204a; and one or more heater(s) 204i. The circulation unit 210 can include a pump 210a, a first pipe 210b operatively connected with the pump 210a and the solvent tank 208, and a second pipe 210c operatively connected with the pump 210a and the fluid inlet 204g of the heating chamber 204. The corresponding units of the device 200 can be configured to operate similarly to the device 100 of FIG. 2.

Figure 4:
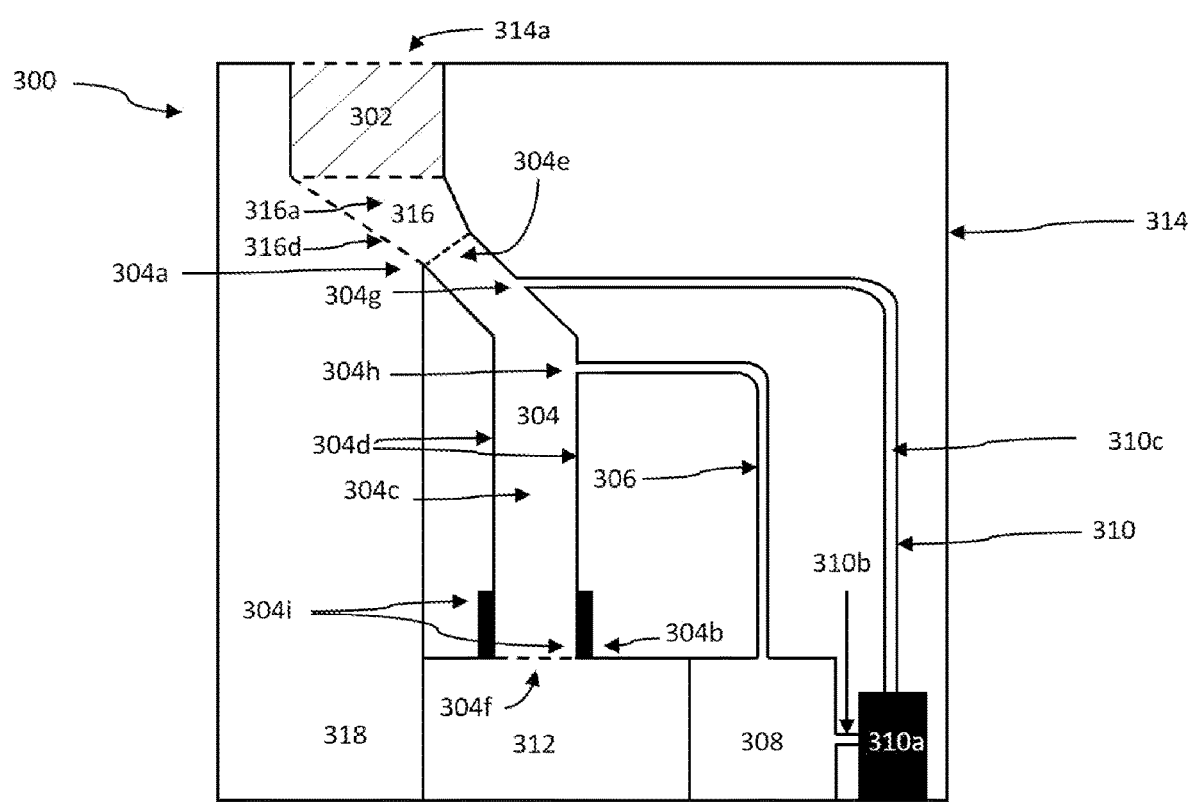
FIG. 4: Schematic of a device according to a third example of the current invention.

Referring to FIG. 4, a device according to another embodiment of the current invention is described. FIG. 4 shows a vertical cross-sectional view of the device 300. The device 300 can include a shredder 302, a connector part 316, a heating chamber 304, a condenser 306, a solvent tank 308, a circulation unit 310, a magma tank 312, a waste tank 318 and a device covering 314. The connector part 316 can be operatively connected with the shredder. The heating chamber 304 can be operatively connected with the connector part 316. The condenser 306 can be operatively connected with the heating chamber 304. The magma tank 312 can be operatively connected with the heating chamber 304. The solvent tank 308 can be operatively connected with the condenser 306. The waste tank 318 can be operatively connected with the connector part 316. The circulation unit 310 can be operatively connected with the solvent tank 308 and the heating chamber 304. The shredder 302, the connector part 316, the heating chamber 304, the condenser 306, the solvent tank 308, the circulation unit 310, the magma tank 312, and the waste tank 318 can be housed inside the device covering 314. The heating chamber 304 can include a hollow elongated body containing a top end 304a, a bottom end 304b at an end opposite to the top end 304a, a lumen 304c extending from the top end 304a to the bottom end 304b, and a wall 304d surrounding the lumen 304c; a material inlet valve 304e connected at the top end 304a; a material outlet valve 304f connected at the bottom end 304b; a fluid inlet 304g connected to the wall 304d near the top end 304a; a fluid outlet 304h connected to the wall 304d near the top end 304a; and one or more heater(s) 304i. The circulation unit 310 can include a pump 310a, a first pipe 310b operatively connected with the pump 310a and the solvent tank 308, a second pipe 310c operatively connected with the pump 310a and the fluid inlet 304g of the heating chamber 304. The shredder material from the shredder can enter the connector part 316. The connector part 316 can be include a tubular body and/or a conical body 316a. The shredded material can enter the tubular body and/or the conical body 316a from the shredder 302 and pass through the tubular/or conical body 316a, e.g., under the force of gravity, and enter the heating chamber 304 via the material inlet valve 304e. The wall of the tubular body and/or the conical body 316a can include a plurality of perforations 316d. At least a portion of liquids in contact with the shredded material and/or entering the tubular body and/or the conical body 316a from the shredder 302 can escape the tubular body and/or the conical body 316a and the connector part 316 through the plurality of perforations 316d and get stored at the waste tank 318. The waste tank 318 can be positioned below the connector part 316 and can be configured to receive at least a portion of liquids escaping the connector part 316 through the plurality of perforations 316d. The other corresponding units of the device 300 can be configured to operate similarly to device 200 (FIG. 3) and 100 (FIG. 2).

Figure 5:
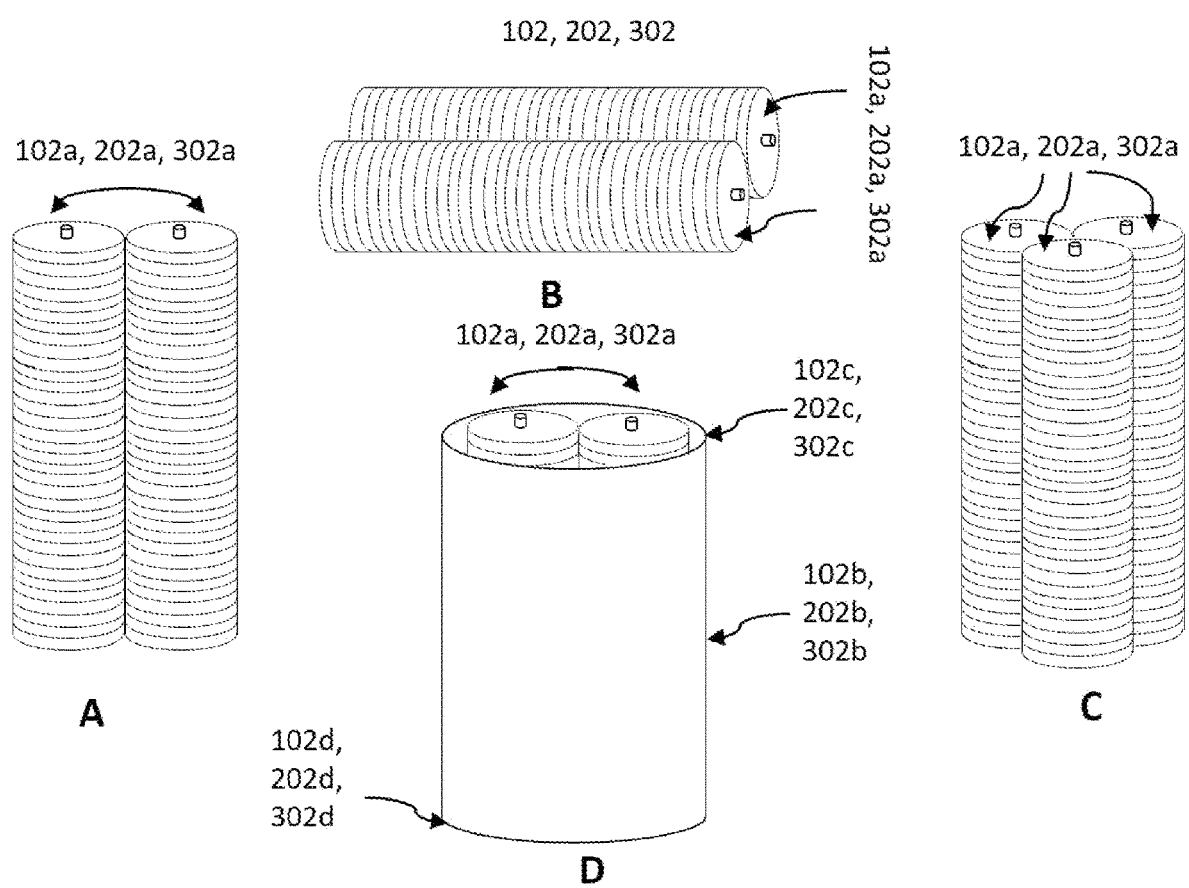
FIG. 5: Shredders according to various examples of the current invention.

The shredder 102, 202, 302 may include a plurality of rotating blades or cutters 102a, 202a, 302a (FIG. 5) configured to shred a material comprising a polymer in an expanded state. FIG. 5 shows non-limiting examples of shredders, rotating blades or cutters and their orientation. The rotating blades or cutters 102a, 202a, 302a can be orientated horizontally (FIG. 5B), vertically (FIG. 5A, 4C) or at any angle as would be appreciated by a person of skill in the art. The number of blades or cutters can also vary. In some aspects, the shredder can include 2 sets of blades or cutter (FIG. 5A, 5B). In some other aspects, the shredder can include 3 sets of blades or cutter (FIG. 5C). In some other aspects, the shredder can include more than 3 sets of blades or cutter. In some aspects, the shredder can include a protective component (102b, 202b, 302b) around or surrounding the rotating blades or cutters 102a, 202a, 302a (FIG. 5D). The protective component can be configured to stop the shredded material (i.e. shredded pieces) from diverging (e. g. to keep the shredded pieces in a desired area), and can form a pathway for the shredded pieces to travel from the shredder to the heating chamber, reducing the losses if any. The protective component can create a barrier for the shredded pieces that may have otherwise been launched by the shredder. The protective component can be of any suitable shape, including but not limited to as cylindrical, conical, or tubular shaped with circular, triangular, square, rectangular, pentagonal, hexagonal, heptagonal, or octagonal cross-section, and size. In some particular aspects, the protective component can be a hollow cylinder with open ends (FIG. 5D). The rotating blades or cutters can be positioned inside the lumen of the protective component cylinder. The material to be shred can access the rotating blades or cutters in the lumen through a first open end of the protective component cylinder (102c, 202c, 302c) and shredded pieces can exit the shredder through the opposite open end (102d, 202d, 302d) of the protective component cylinder. The protective component can be made of a material containing a plastic material and/or a metallic material. In some aspects, the length of the shredder can be about 5, 6, 7, 8, 9, 10, 11, 12, 13, 14, 15, 16, 17, 18, 19, or 20 inches or between any two of those values. In some aspects, the width of the shredder can be about 2, 3, 4, 5, 6, 7, 8, 9, 10, 11, 12, 13, 14, or 15, inches or between any two of those values. In some aspects, the height of the shredder can be about 1, 2, 3, 4, 5, 6, 7, 8, 9, 10, 11, 12, 13, 14, or 15, inches or between any two of those values. In some particular aspects, the shredder can have dimensions about 8 to 16 in×4 to 10 in×1 to 5 in. Shredder of having other dimensions can also be used. In some aspects, the shredder can be configured to shred a material into pieces having average dimensions about 0.1 to 3 in×0.01 to 2 in×0.01 to 2 in. It should be appreciated that the present invention is not limited to a particular type of shredding mechanism and configuration, any suitable shredder as would be appreciated by a person of skill in the art can be used.

The hollow elongated body of the heating chamber 104, 204, 304 can be of any suitable shape and size as would be appreciated by a person of skill in the art. In some aspects, the elongated body can be cylindrical shaped, conical shaped, or tubular shaped with circular, triangular, square, rectangular, pentagonal, hexagonal, heptagonal, or octagonal cross-section with no, or one or more bends. The walls 104d, 204d, 304d of the hollow elongated body can have high thermal conductivity and can withstand temperature up to 200° F. or higher. In some aspects, the walls 104d, 204d, 304d of the hollow elongated body can be made of a material containing a metallic material (e.g. includes elemental metal, metal compound and/or alloy). In some aspects, the metallic material can be steel such as galvanized steel. The material inlet valve 104e, 204e, 304e can be configured to conditionally allow the shredded material to enter the heating chamber 104, 204, 304. The material inlet valve 104e, 204e, 304e can have an open and a closed configuration. In the open configuration the shredded material can enter the heating chamber 104, 204, 304 through the material inlet valve 104e, 204e, 304e. In the closed configuration, material or fluid cannot pass through the valve 104e, 204e, 304e. The material outlet valve 104f, 204f, 304f can be configured to conditionally allow the magma to exit the heating chamber 104, 204, 304. The material outlet valve 104f, 204f, 304f can have an open and a closed configuration. In the open configuration, the magma from the heating chamber 104, 204, 304 can enter the magma tank 112, 212, 312 through the material outlet valve 104f, 204f, 304f. In the closed configuration, material or fluid cannot pass through the valve 104f, 204f, 304f. In some aspects, the material inlet valve and/or material outlet valve can be made of a material containing a thermoplastic, such as polyvinyl chloride. The fluid inlet 104g, 204g, 304g can be configured to allow the organic solvent from solvent tank 108 to enter the heating chamber 104, 204, 304. In some aspects, the fluid inlet 104g, 204g, 304g can include a spraying mechanism and the organic solvent can be sprayed into the lumen 104c, 204c, 304c of the heating chamber 104, 204, 304. The fluid outlet 104h, 204h, 304h can be configured to allow the evaporated organic solvent from the heating chamber 104, 204, 304 to exit the heating chamber and enter the condenser 106, 206, 306. The heating chamber 104, 204, 304 can be configured such that the evaporated organic solvent can escape the heating chamber only through the fluid outlet valve 104h, 204h, 304h. In some aspects, the heater(s) 104i, 204i, 304i can be cartridge heaters. Other type(s) of heater can also be used. In some aspects, the hollow elongated body can have an average inner diameter 1, 2, 3, 4, 5, 6, 7, 8, 9, 10 inch or between any two of those values. In some aspects, the hollow elongated body can have a length 1, 2, 3, 4, 5, 6, 7, 8, 9, 10, inch or between any two of those values.

Figure 6:
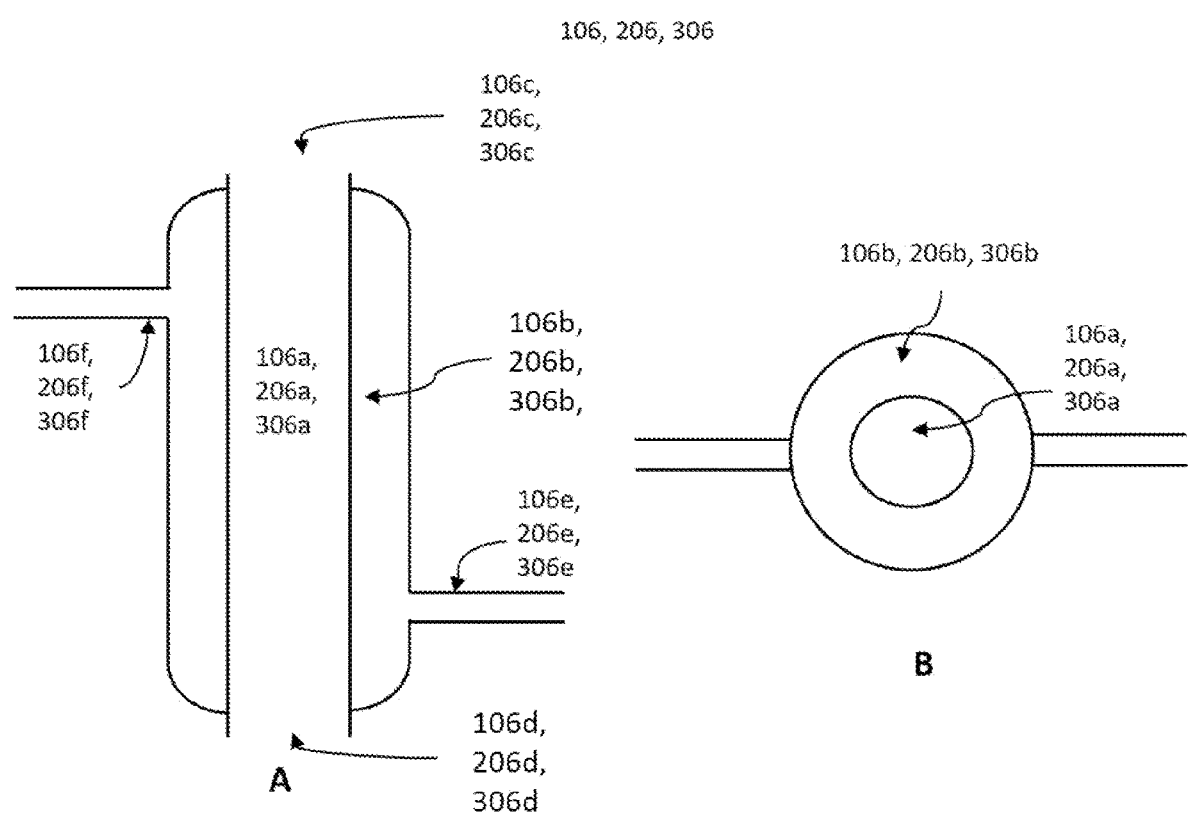
FIG. 6: Side view (A) and top view (B) of condensers according to various examples of the current invention.

The condenser 106, 206, 306 can be configured to cool and condense the evaporated organic solvent. The condenser 106, 206, 306 can be any condenser known in the art, such as Liebig type condenser. In some aspects, the condenser can be a evaporative condenser. In some aspects, the condenser 106, 206, 306 can have an inner duct 106a, 206a, 306a (FIG. 6). The inner duct 106a, 206a, 306a can be a straight tube, a spiral tube (not shown), a zigzag tube (not shown), a tube with two or more bends (not shown) or of any shape as would be appreciated by one of skill. The evaporated organic solvent from the heating chamber 104, 204, 304 can enter the inner duct 106a, 206a, 306a through a first end 106c, 206c, 306c. The evaporated organic solvent can pass through the inner duct 106a, 206a, 306a from the first end 106c, 206c, 306c towards the second end 106d, 206d, 306d and get cool and condensed. The condensed organic solvent i.e. organic solvent in liquid form can exit the condenser through the second end 106d, 206d, 306d and enter the solvent tank

108, 208, 308. In some aspects, the condenser can include an outer duct 106*b*, 206*b*, 306*b* surrounding the inner duct 106*a*, 206*a*, 306*a*. In some aspects, a liquid, such as water at temperatures such as 0° C. to 30° C. can be passed through the outer duct 106*b*, 206*b*, 306*b* to cool and condense the evaporated solvent in the inner duct 106*a*, 206*a*, 306*a*. In some aspects, the liquid such as water can enter the outer duct 106*b*, 206*b*, 306*b* through an inlet 106*e*, 206*e*, 306*e* and exit the outer duct through an outlet 106*f*, 206*f*, 306*f*. In some aspects, the inner and outer duct can form concentric tubes (FIG. 6B). In some aspects, the condenser can be made of a material having low thermal conductivity. In some aspects, the condenser can be made of a material containing glass. In some aspects, the inner duct 106*a*, 206*a*, 306*a* can have an average diameter 0.5, 0.6, 0.7, 0.8, 0.9, 1.0, 1.1, 1.2, 1.3, 1.4, or 1.5, inches or between any two of those values. In some aspects, the inner duct 106*a*, 206*a*, 306*a* can have a length 3, 4, 5, 6, 7, 8, 9, 10, 11, 12, 13, 14, 15, 16, 17, 18, 19, 20, 21, 22, 23, 24 or 25, inches or between any two of those values. In some aspects, the solvent tank 108, 208, 308 can be made of a material that do not readily degrade in presence of and/or by the contact of the organic solvent. In some aspects, the solvent tank 108, 208, 308 can be made of a material containing a thermoplastic such as polypropylene, polytetrafluoroethylene, and/or polyethylene. In certain aspects, the solvent tank can have a volume 20, 25, 30, 35, 40, 45, 50, 55, 60, 65, 70, 75, 80, 85, 90, 95, or 100 cubic inch, or between any two of those values.

The magma tank 112, 212, 312 can be removably attached with the heating chamber 104, 204, 304. In some aspects, the magma tank 112, 212, 312 can have a volume 100, 110, 120, 130, 140, 150, 160, 170, 180, 190, or 200 cubic inch, or between any two of those values.

Figure 7:
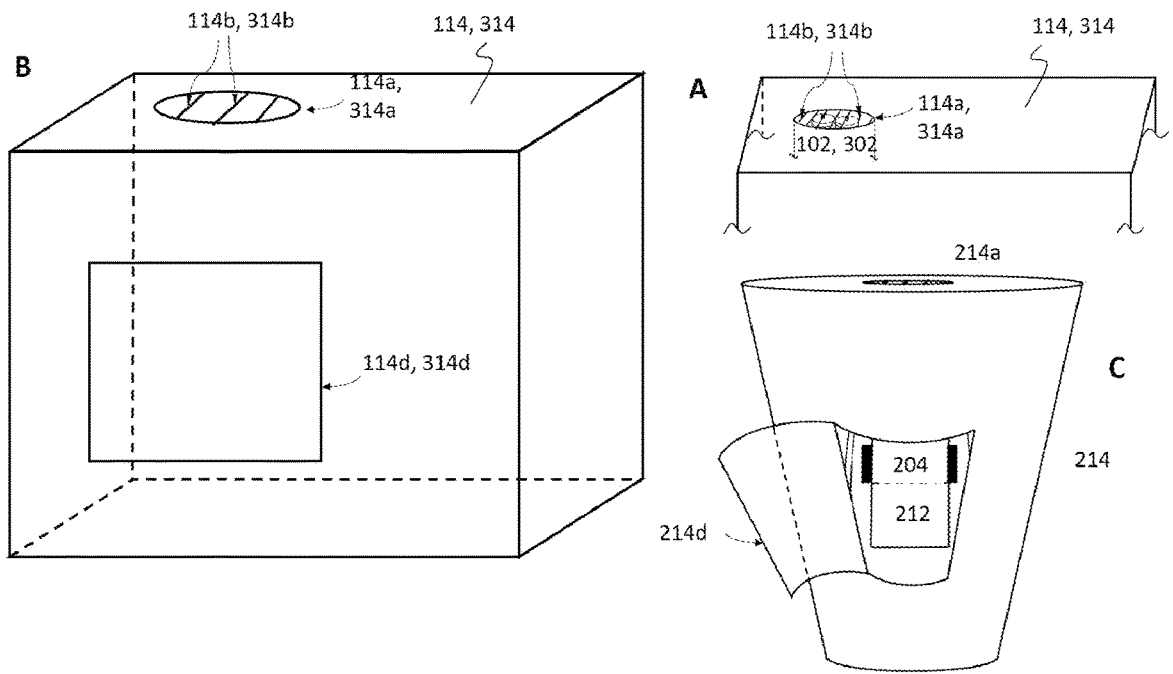
FIG. 7: Device contains according of various examples of the current invention.
Figure 8:
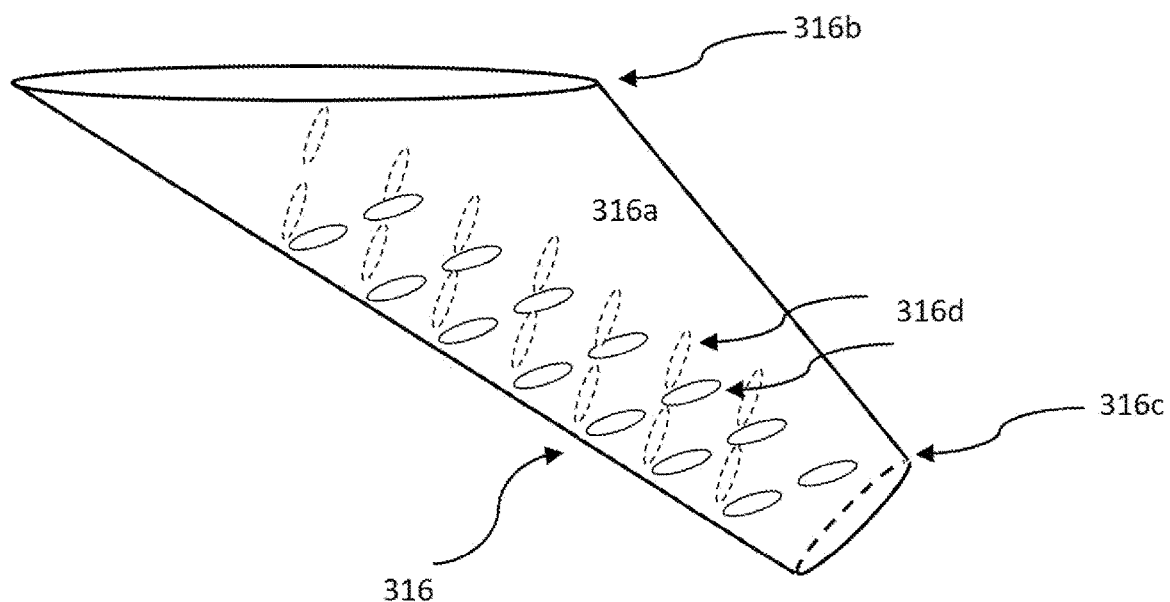
FIG. 8: Connector part according to the third example.

The first pipe 110*b*, 210*b*, 310*b* and/or the second pipe 110*c*, 210*c*, 310*c* can be made of a material that do not readily degrade by the contact of the organic solvent. In some aspects, the first pipe 110*b*, 210*b*, 310*b* and/or the second pipe 110*c*, 210*c*, 310*c* can be made of a material containing silicone rubber. Interior components of the pump 110*a*, 210*a*, 310*a*, that can come in contact with the organic solvent during circulation of the organic solvent through the pump 110*a*, 210*a*, 310*a*, can be coated with or made of a material that does not readily degrade by the contact of the organic solvent. The device covering 114, 214, 314 can be of any suitable shape and size. The device covering 114, 214, 314 can be cube (not shown), box shaped (FIG. 2, FIG. 4), cylindrical (not shown), conical (FIG. 3) or of any suitable shape. In some aspects, the device covering 114, 214, 314 can have one or more transparent walls. The device covering 114, 214, 314 can have an opening 114*a*, 214*a*, 314*a* through which a material can be put into the shredder 102, 202, 302 for shredding. In some aspects, the opening 114*a*, 214*a*, 314*a* can have protective component 114*b*, 214*b*, 314*b*. The protective component can be configured to substantially prohibit body parts, such as finger and/or hand of a subject getting into the shredder 102, 202, 302. The opening 114*a*, 314*a* and the protective component 114*b*, 314*b* for the device 100 (FIG. 2) and 300 (FIG. 3) is shown in FIG. 7A-7B. In some aspects, the device covering 114, 214, 314 can include a door 114*d*, 214*d*, 314*d* that can be opened to access the magma tank 112, 212, 312 inside the device covering 114, 214, 314. The magma tank 112, 212, 312 can be taken in or out of the device covering 114, 214, 314 and attached to or detached from the heating chamber 104, 204, 304 through the door 114*d*, 214*d*, 314*d* opening. The door 114*d*, 214*d*, 314*d* can remain closed when access to the magma tank is not required. FIG. 7B shows the door 114*d*, 314*d* in closed configuration for the device 100 (FIG. 2) and 300 (FIG. 3). FIG. 7C shows the door 214*d* in open configuration for the device 200 (FIG. 3). In some aspects, the organic solvent tank 108, 208, 308 can be accessed through the door 114*d*, 214*d*, 314*d* or other additional opening in the covering 114, 214, 314 to put the organic solvent into the tank 108, 208, 308 from outside or take out at least a portion of the organic solvent from the tank 108, 208, 308 to outside.

The connector part 316 can be configured to receive the shredded material from the shredder 302 and transfer the shredded material to the heating chamber 304. The connector part 316 can include a tubular/or conical body 316*a*. The tubular/or conical body 316*a* can receive the shredded material at a first end 316*b*. In some aspects, the tubular/or conical body 316*a* can be oriented at an angle, such as 15° to 80°, with respect to the horizontal axis. The shredded material entering through the first end 316*b* can pass through the tubular/or conical body 316*a* to a second end 316*c* of the tubular/or conical body 316*a* e.g., due to the angular orientation and force of gravity. The shredded material can exit the connector part 316 through the second end 316*c* and enter the heating chamber 304, via the material inlet valve 304*e*. The tubular/or conical body 316*a* can have a wall with plurality of perforations 316*d*. At least a portion of the liquids entering the connector part 316 from the shredder 302 and/or liquids in contact with the shredded material in the connector part 316 can escape through the perforations 316*d* and get stored in the waste tank 318. In some aspects, the diameter of the connector part 316 at the first end 316*b* can be bigger than the diameter of the connector part in the second end 316*c*. In some aspects, the diameter of the connector part 316 at the first end 316*b* can be 3, 4, 5, 6, 7, 8, 9, 10, 11, 12 inch or between any two of those values. In some aspects, the diameter of the connector part 316 at the second end 316*c* can be 0.5, 1, 2, 3, 4, 5, 6, 7, 8 inch or between any two of those values. The connector part can be made of any suitable material. In some aspects, the connector part 316 can be made of a material containing a thermoplastic such as polyvinyl chloride, polypropylene, polytetrafluoroethylene, and/or polyethylene and/or a metallic material.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:
1. A device for recycling a polymer in an expanded state, the device comprising;
   a shredder, configured to shred the polymer in an expanded state to form a shredded polymer in an expanded state;

a heating chamber operatively connected to the shredder, said heating chamber is configured to (i) receive the shredded polymer in an expanded state from the shredder and an organic solvent, (ii) contact the shredded polymer in an expanded state with the organic solvent to form a mixture comprising the organic solvent and a magma, the magma being a non-expanded amorphous polymer, and (iii) heat the mixture to evaporate the organic solvent;

a magma tank positioned below the heating chamber and configured to receive the magma from the heating chamber;

a condenser operatively connected to the heating chamber, said condenser is configured to receive the evaporated organic solvent from the heating chamber and condense the evaporated organic solvent into a liquid form;

a solvent tank operatively connected to the condenser, configured to receive the organic solvent from the condenser and store the organic solvent; and a circulation unit operatively connected to the solvent tank and the heating chamber, said circulation unit is configured to circulate the organic solvent from the solvent tank to the heating chamber.

2. The device of claim 1, wherein the heating chamber comprises:
a hollow elongated body comprising a top end, a bottom end at an end opposite to the top end, a lumen extending from the top end to the bottom end, and a wall surrounding the lumen;
a polymer in an expanded state inlet valve connected at the top end;
a polymer in a non-expanded state outlet valve connected at the bottom end;
a fluid inlet connected to the wall near the top end;
a fluid outlet connected to the wall near the top end; and
an heater, wherein the polymer in an expanded state inlet valve is configured to allow the shredded polymer in an expanded state from the shredder to enter the lumen of the hollow elongated body, the fluid inlet is configured to allow the organic solvent from the solvent tank to enter the lumen of the hollow elongated body, the hollow elongated body is configured to contact the organic solvent and the shredded polymer in an expanded state in the lumen and form the mixture comprising the magma and the organic solvent at or near the bottom end, the heater is configured to heat the mixture to form the evaporated organic solvent, the fluid outlet is configured to allow the evaporated organic solvent to exit the lumen, and the polymer in a non-expanded state outlet valve is configured to conditionally allow the magma to exit the hollow elongated body.

3. The device of claim 1, further comprising a connector part comprising a tubular and/or conical body comprising a wall with a plurality of perforations and a long axis tilted horizontally at an angle 10° to 80°, said connector part is operatively connected with the shredder and the heating chamber.

4. The device of claim 1, further comprising a waste tank positioned below the connector part, the waste tank is configured to receive liquid exiting the connector part through the plurality of perforations.

5. The device of claim 1, wherein the device is housed inside a device covering.

6. The device of claim 5, wherein the device covering comprises one or more transparent walls.

7. The device of claim 1, wherein the shredder comprises a plurality of rotating blades or cutters configured to shred the polymer in an expanded state and a protective component around the rotating blades or cutters.

8. The device of claim 1, wherein the condenser is an evaporative condenser.

9. The device of claim 1, wherein the heater is a cartridge heater.

10. The device of claim 1, wherein the circulation unit comprises a pump, a first pipe operatively connected with the pump and the solvent tank, and a second pipe operatively connected with the pump and the heating chamber, wherein the pump is configured to withdraw the organic solvent from the solvent tank via the first pipe and circulate the organic solvent to the heating chamber via the second pipe.

11. A method for recycling a polymer in an expanded state using the system of claim 1, the method comprising:
shredding the polymer in an expanded state with the shredder to form a shredded polymer in an expanded state;
contacting the shredded polymer in an expanded state and an organic solvent in the heating chamber to form a mixture comprising a magma comprising a polymer in a non-expanded state and the organic solvent;
heating the mixture to evaporate the organic solvent and separate magma from the organic solvent;
introducing the evaporated organic solvent in the condenser and condensing the evaporated organic solvent to form the organic solvent; and
introducing the organic solvent in the solvent tank from the condenser.

12. The method of claim 11, wherein volume of the polymer in the non-extended amorphous state is 10% to 20% of volume of the polymer in the expanded state.

13. The method of claim 11, wherein the polymer is polystyrene and the polymer in the expanded state is Styrofoam.

14. The method of claim 11, wherein the organic solvent is acetone.

15. The method of claim 11, wherein the mixture is heated at a temperature of 55° C. to 65° C.

* * * * *